(12) United States Patent
Krishnan et al.

(10) Patent No.: US 8,185,639 B2
(45) Date of Patent: *May 22, 2012

(54) SERVER IDENTIFICATION IN STORAGE NETWORKS

(75) Inventors: Sriram Krishnan, Shrewsbury, MA (US); Andreas L. Bauer, Boxborough, MA (US); Russell R. Laporte, Webster, MA (US); Gregory W. Lazar, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 840 days.

This patent is subject to a terminal disclaimer.

(21) Appl. No.: 11/324,786

(22) Filed: Jan. 3, 2006

(65) Prior Publication Data

US 2007/0156877 A1 Jul. 5, 2007

(51) Int. Cl.
*G06F 15/16* (2006.01)
(52) U.S. Cl. ........ 709/228; 709/206; 709/217; 709/218; 709/237; 713/172; 713/173; 711/147; 711/152; 711/156
(58) Field of Classification Search ............ 726/5–9; 380/229; 705/65–69; 713/172–174
See application file for complete search history.

(56) References Cited

U.S. PATENT DOCUMENTS

| | | | |
|---|---|---|---|
| 6,061,753 A | 5/2000 | Ericson | 710/107 |
| 6,665,714 B1 * | 12/2003 | Blumenau et al. | 709/222 |
| 6,671,776 B1 | 12/2003 | Dekoning | 711/114 |
| 6,754,718 B1 | 6/2004 | Dobberpuhl et al. | 709/250 |
| 6,839,747 B1 * | 1/2005 | Blumenau et al. | 709/223 |
| 6,845,395 B1 * | 1/2005 | Blumenau et al. | 709/223 |
| 6,947,939 B2 * | 9/2005 | Fujibayashi et al. | 701/469 |
| 6,985,994 B2 * | 1/2006 | Kanai et al. | 711/111 |
| 6,988,130 B2 * | 1/2006 | Blumenau et al. | 709/213 |
| 7,010,493 B2 * | 3/2006 | Yamamoto et al. | 705/32 |
| 7,051,121 B2 * | 5/2006 | Ohno et al. | 710/5 |
| 7,076,688 B2 * | 7/2006 | Yamamoto | 714/6.1 |
| 7,136,923 B2 * | 11/2006 | Yamaguchi et al. | 709/224 |
| 7,165,152 B2 * | 1/2007 | Blumenau et al. | 711/152 |
| 7,206,823 B2 * | 4/2007 | Furukawa et al. | 709/218 |
| 7,228,382 B2 * | 6/2007 | Kanai et al. | 711/114 |
| 7,272,728 B2 * | 9/2007 | Pierson et al. | 713/194 |
| 7,328,260 B1 * | 2/2008 | Muthiyan et al. | 709/224 |
| 7,373,670 B2 * | 5/2008 | Mimatsu et al. | 726/27 |
| 7,398,273 B2 | 7/2008 | Dobberpuhl | |

(Continued)

FOREIGN PATENT DOCUMENTS

EP 1 117 028 A 7/2001

(Continued)

OTHER PUBLICATIONS

Selim G. Akl, Peter D. Taylor, Cryptographic solution to a problem of access control in a hierarchy, ACM Transactions on Computer Systems (TOCS), v.1 n.3, p. 239-248, Aug. 1983.*

(Continued)

*Primary Examiner* — Backhean Tiv
(74) *Attorney, Agent, or Firm* — Muirhead and Saturnelli, LLC

(57) ABSTRACT

Described are techniques for providing a host identifier for a host. A first portion including a first identifier associated with a system for the host is received. A second portion including a second identifier generated in accordance with a hardware property of the host is received. The host identifier is formed using the first and second portions. The host identifier is used to uniquely identify the host in a storage area network.

20 Claims, 9 Drawing Sheets

U.S. PATENT DOCUMENTS

| | | | |
|---|---|---|---|
| 7,424,575 B2* | 9/2008 | Kanai et al. | 711/114 |
| 7,454,795 B2* | 11/2008 | Mizuno | 726/27 |
| 7,656,823 B1* | 2/2010 | Monga et al. | 370/255 |
| 7,664,839 B1* | 2/2010 | Karr et al. | 709/223 |
| 7,710,898 B2* | 5/2010 | Graves | 370/254 |
| 7,734,712 B1* | 6/2010 | Meyer et al. | 709/213 |
| 7,802,251 B2* | 9/2010 | Kitamura | 718/1 |
| 2002/0083339 A1 | 6/2002 | Blumenau et al. | 726/23 |
| 2002/0129230 A1* | 9/2002 | Albright et al. | 713/1 |
| 2002/0184509 A1* | 12/2002 | Scheidt et al. | 713/185 |
| 2003/0154406 A1* | 8/2003 | Honarvar et al. | 713/201 |
| 2004/0059951 A1* | 3/2004 | Pinkas et al. | 713/202 |
| 2004/0078599 A1* | 4/2004 | Nahum | 713/201 |
| 2004/0210791 A1* | 10/2004 | Akagawa et al. | 714/2 |
| 2005/0235148 A1* | 10/2005 | Scheidt et al. | 713/168 |
| 2007/0156877 A1* | 7/2007 | Krishnan et al. | 709/223 |

FOREIGN PATENT DOCUMENTS

| | | | |
|---|---|---|---|
| EP | 1406459 A1 * | 4/2004 | |

OTHER PUBLICATIONS

Dorothy E. Denning, Dennis K. Branstad, A taxonomy for key escrow encryption systems, Communications of the ACM, v.39 n.3, p. 34-40, Mar. 1996.*

U.S. Appl. No. 11/324,785, filed Jan. 3, 2006, Krishnan.

Hu Yoshida: "LUN Security Considerations for Storage Area Networks", Hitachi Data Systems, 1999, pp. 1-7, XP002185193.

* cited by examiner

| | software generated id (Portion 1) | HBA WWN | Hardware ID (Portion 2) | Inference |
|---|---|---|---|---|
| 320 | Same | Same | Same | None |
| 322 | Same | Same | Difference | Hardware replaced |
| 324 | Same | Difference | Same | New HBA |
| 326 | Same | Difference | Difference | New host |
| 328 | Difference | Same | Same | Original server reinstallation or both hw and HBA moved |
| 330 | Difference | Same | Difference | HBA moved |
| 332 | Difference | Difference | Same | Hardware moved |
| 334 | Difference | Difference | Difference | New host |

FIGURE 5

SERVER IDENTIFICATION IN STORAGE NETWORKS

CROSS-REFERENCES TO RELATED APPLICATIONS

This application is related to copending U.S. application Ser. No. 11/324,785, filed Jan. 3, 2006.

BACKGROUND

1. Technical Field

This application generally relates to data storage systems, and more particularly to techniques used with providing access to data storage systems and managing secure data access.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems and servers may be configured in a network arrangement referred to as a Storage Area Network (SAN). Each of the servers may have access to different physical devices, and/or logical portions thereof, included in the SAN. Software residing on the data storage systems may be used in connection with enforcing data storage system access rules as may be specified for each of the different servers. The software residing on the data storage systems may use different techniques in identifying the particular hosts and associated connectivity to the data storage systems.

One technique uses a software generated host identifier (host id). At various times, such as when a host boots up, an agent or other software on the host may push the software generated host id through one or more paths to the data storage systems in the SAN. An agent may be, for example, a daemon process or service. The data storage system associates the particular paths through which the same host id is pushed as being paths from the same host. When storage access to a particular device in the SAN is defined for a given host, access is allowed to the particular device when a request is received from one of those paths associated with the given host.

There may be instances when a same software-generated host id is used in connection with two different hosts or servers. For example, a system image of a first host may be "cloned" or copied for use on a second host. If the software-generated host id is copied to the second host with the system image, the same host id may be also propagated. Accordingly, the same host id is now associated with two different hosts with the additional new paths coming from the second host. This poses a security access issues since the second host may be provided with the same data storage access as the first host.

As an alternative, the host id may be derived from a property that is unique to the hardware of each host. Although this latter alternative overcomes the problems associated with the former technique, additional drawbacks are introduced. For example, the hardware from which the host id is formed may be removed from a host. If the hardware is moved from one host to another, the new host may assume the identity of the former host and data storage access previously granted to the original host may be granted to the new host when it should not be granted. Additionally, when the hardware of an existing host is replaced, the existing host may be improperly denied storage access.

SUMMARY OF THE INVENTION

In accordance with one aspect of the invention is a method for providing a host identifier for a host comprising: receiving a first portion, the first portion including a first identifier associated with a system image for the host; receiving a second portion, the second portion including second identifier generated in accordance with a hardware property of the host; and forming the host identifier using the first portion and the second portion, the host identifier being used to uniquely identify the host in a storage area network. The first identifier may be produced using software executed on the host. The first identifier may be user specified. The first identifier may be specified using a network address of the host and at least a portion of a timestamp. The hardware property may be an address associated with a hardware component of the host. The hardware property may be a network interface card and the address may be a world wide name, the world wide name being a unique address assigned to the hardware component when manufactured.

In accordance with another aspect of the invention is a method for processing a management request comprising: receiving a management request at a data storage system from a first connectivity point of a host, the management request having an associated host identifier identifying the host and a second identifier identifying the first connectivity point; and determining, by the data storage system in accordance with data including the host identifier and the second identifier associated with the management request, if there is a corresponding entry in an access control table, the determining including identifying one of a plurality of cases indicating a degree of correspondence between portions of the host identifier and the second identifier to an existing entry in the access control table. The host identifier of the host may include a first portion and a second portion, the first portion generated in accordance with an identifier associated with a system image of the host, and the second portion generated, in accordance with a hardware property of the host. The method may also include determining differences between entries in the access control table and the host identifier; and performing an action based on any determined differences. The method may also include determining that the host is a new host if an entry in the access control table does not include information corresponding to the second identifier and the second portion of the host identifier. The method may also include determining that a hardware component of the host having the hardware property has been replaced if an entry in the access control table includes information corresponding to the second identifier and the first portion of the host identifier, and does not include information corresponding to the second portion of the host identifier, and updating entries in the access control table for the host to include the second portion. The method may also include determining that new hardware associated with the first connectivity point has been installed at the host if an entry in the access control table includes information corresponding to the first and second portions of the host identifier, and does not include information corresponding to the second identifier associated with the first connectivity point, and accordingly updating entries in the access control table. The method may also include determining that hardware associated with the first connectivity point of the host has been included for use with another host if there is an entry in the access control table including information corresponding to the second identifier, and the entry does not include information corresponding to the first and second portions of the host identifier. The method may also include determining that a hardware component of the host having the hardware property has been included for use with another host if an existing entry in the access control table includes information corresponding to the second portion of the host identifier and the entry does not include information corresponding to the first portion of the host identifier and said the second identifier. The method may also include determining that the host has been reinstalled, or that a hardware component of the host having the hardware property and another hardware component associated with the first connectivity point have been moved to another host from the host if an existing entry in the access control table includes information corresponding to the second portion of the host identifier and the second identifier and the entry does not include information corresponding to the first portion of the host identifier. The method may also include performing an action in accordance with a policy and in accordance with the one of the plurality of cases selected by the determining, the policy indicating whether the action is to be performed without further user interaction.

In accordance with another aspect of the invention is a computer program product for providing a host identifier for a host comprising code that: receives a first portion, the first portion including a first identifier associated with a system image for the host; receives a second portion, the second portion including a second identifier generated in accordance with a hardware property of the host; and forms the host identifier using the first portion and the second portion, the host identifier being used to uniquely identify the host in a storage area network. The first identifier may be produced using software executed on the host. The first identifier may be generated using a network address of the host and at least a portion of a timestamp. The hardware property may be an address associated with a hardware component of the host.

BRIEF DESCRIPTION OF THE DRAWINGS

Features and advantages of the present invention will become more apparent from the following detailed description of exemplary embodiments thereof taken in conjunction with the accompanying drawings in which:

FIG. 5 is an example of an embodiment of a case table;

DETAILED DESCRIPTION OF EMBODIMENT(S)

Figure 1:
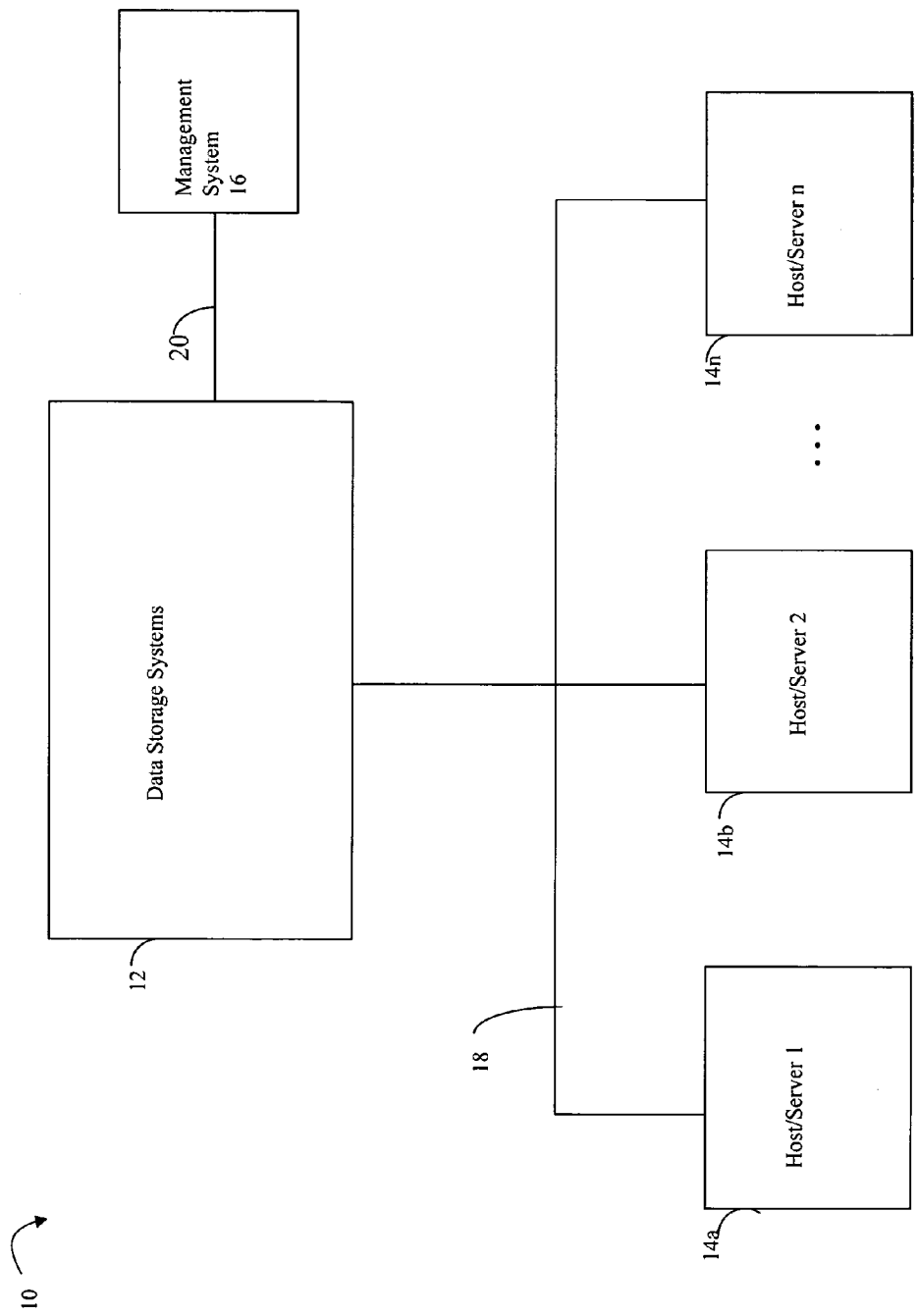
FIG. 1 is an example of an embodiment of a computer system that may utilize the techniques described herein.

Referring now to FIG. 1, shown is an example of an embodiment of a computer system that may be used in connection with performing the techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSCI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSCI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

As will be described in more detail herein, the management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. Techniques that may be used in connection with data storage system management are described in more detail elsewhere herein.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to one of the foregoing logically defined devices or volumes.

Figure 2:
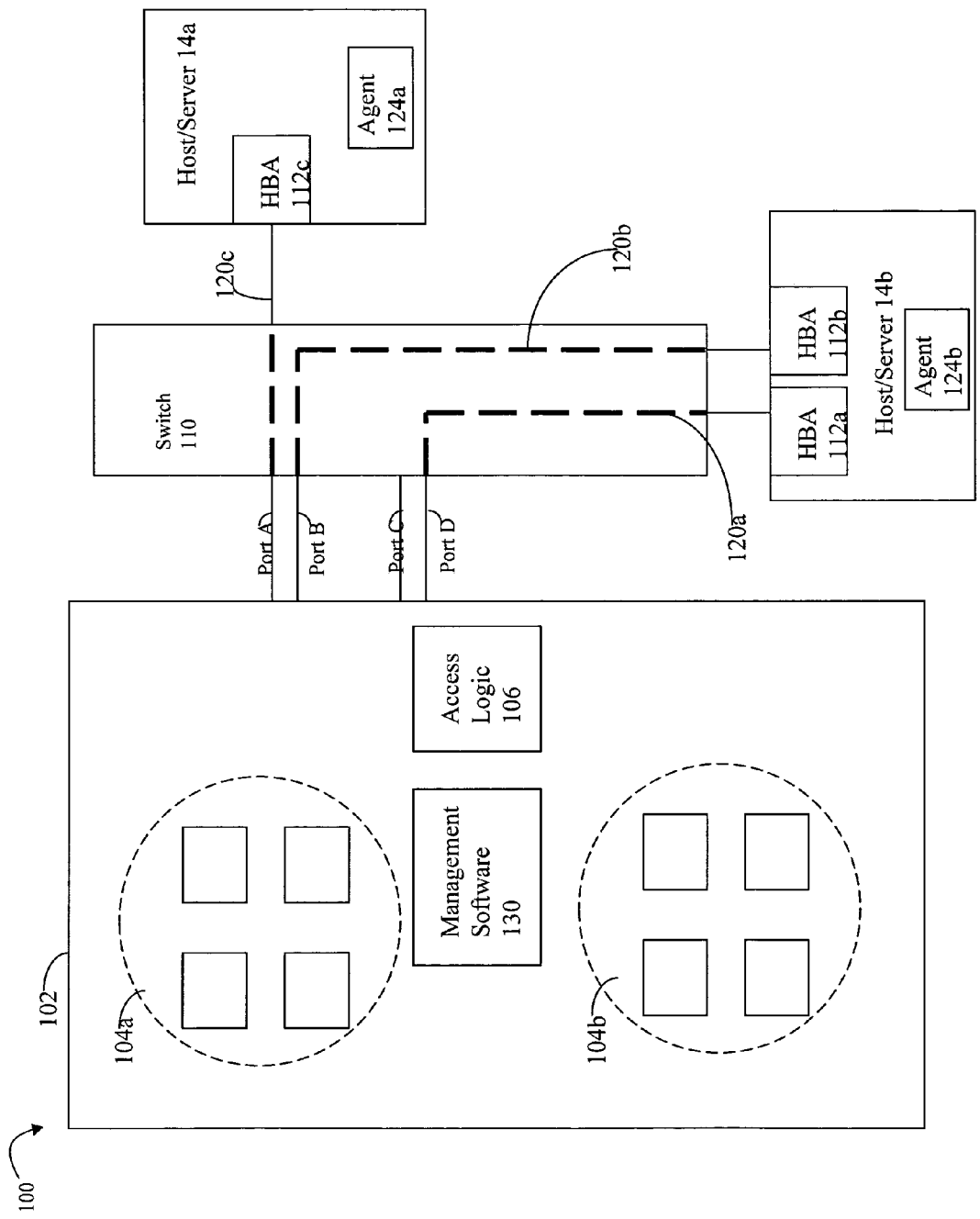
FIG. 2 is an example of an embodiment of components of FIG. 1 in more detail as may be used in connection with techniques described herein.

Referring now to FIG. 2, shown is an example 100 of components that may be used in connection with techniques described herein. The example 100 may represent components included in a storage area network (SAN). Included in the example 100 is a data storage system 102, a switch 110, and hosts or servers 14a and 14b. The switch 110 may be used in connection with facilitating communications between each of the hosts 14a and 14b and the data storage system 102. Communications between a host and the data storage system 102 may be defined in terms of a path. Host 14a communicates with the data storage system 102 over a path designated as 120c. Path 120c is formed by the starting point, the HBA or host bus adapter 112c and the ending point, port A of the receiving data storage system 102. Host 14b communicates with the data storage system 102 over two paths designated as 120a and 120b. Path 120a is formed by the starting point, the HBA 112a, and the ending point, port d of the receiving data storage system 102. Path 120b is formed by the starting point, the HBA 112b, and the ending point, port b of the receiving data storage system 102. Each port of an HBA may be characterized as a connectivity point providing connectivity to the data storage system from the host associated with the HBA. It should be noted that different HBAs from the same or different hosts may also communicate with the data storage system through a same port of the data storage system although each path 112a, 112b, and 112c use a different port. Each host 14a and 14b is also illustrated as including an agent, agents 124a and 124b, respectively. Particular processing that may be performed by each of these agents is described in following paragraphs. An agent may be characterized as a process, such as a daemon process, or a service running on the illustrated system. It should also be noted that rather than include an agent, an embodiment may include other software utilities performing the functions and processing steps of the agent which may be implemented, for example, as a daemon or service.

As described herein, an embodiment may represent a path using the WWN (world wide name) of a host's HBA and the WWN of a data storage system port receiving the request. As known to those skilled in the art, a WWN is a unique number assigned by a recognized naming authority that identifies a connection or a set of connections to the network. A WWN may be assigned for the life of a connection (device). As known to those skilled in the art, various networking technologies that may be used in an embodiment make use of WWNs. In connection with the techniques described herein, other embodiments may use other ways in defining a path that may vary with the connectivity in each embodiment. Although not illustrated in FIG. 2, management software may also execute on the management system 16 of FIG. 1 which is used in connection with management of the data storage system in 102.

Each HBA may include one or more ports although in the example illustrated, each HBA has only a single port. Additionally, although only a single data storage system is illustrated for purposes of simplicity in illustration, each of the hosts may have connections to more than one data storage system in the SAN. Additionally, each host may be connected to the data storage system 102 using other connections, including direct cabling, than as illustrated in FIG. 2.

Each host, through its one or more paths, may be allowed to access a specified set of LUNs. A storage group may be defined as a container or set of LUNs. In this example, a first storage group or container of LUNs may be defined as 104a and a second storage group or container of LUNS may be defined as 104b. Only a portion of all the storage included in 102 may be visible to each host as designated by the different storage groups. In one example, LUNs included in 104a may be visible to host 14a and a second different set of LUNs included in 104b may be visible to host 14b. Although in this example, the sets of LUNs 104a and 104b may be mutually exclusive, it should be noted that each set may also include one or more of the same LUNs in accordance with the particular access to be allowed to each of the hosts or servers.

Host access to particular defined sets of LUNs is controlled using the access logic 106. Techniques that may be performed in an embodiment of the access logic 106 using the information in the access control table to control access to logical devices are described in U.S. Pat. No. 6,061,753, issued on May 9, 2000, entitled "Apparatus and Method of Accessing Target Devices Across a Bus Utilizing Initiator Identifiers", Ericson, which is incorporated by reference herein. The access logic component 106 performs processing for any incoming data access request to the data storage system 102. The access logic 106 may be characterized as hardware and/or software that performs a filtering operation of received data requests allowing access to defined sets of LUNs. The particular set of LUNs which are accessible or visible to each of the hosts or servers may be configurable. Also, the particular groupings or sets of LUNs included in each grouping may be configurable. Information regarding which sets of LUNs, such as 104a and 104b, are visible to which hosts may be stored in an access control table in the data storage system 102. One embodiment of the access control table is described in more detail in following paragraphs and in connection with other figures.

Requests received by the data storage system 102 may be of a variety of different types. In one embodiment, requests of a first type may be characterized as data requests to access data on the data storage system. Such requests may include, for example, read and write requests from hosts for data included on devices of the data storage system. The access logic component 106 may allow a host access to a particular storage group based on the path from which a request is received.

Another type of request that may be received by the data storage system 102 may be characterized as a management request. Such requests may be used in connection with performing management operations for the SAN in which the data storage system may be included. Requests for management operations may be processed by the management software 130 included in the data storage system. Management requests may be sent by agents, such as 124a and 124, or other software components on each host, such as 14a and 14b. There may also be different categories or types of management requests. In connection with one type of management request, a push command, the agents 124a and 124b may push or send information to the data storage system to define a topology of the SAN by discovering connectivity between servers and attached storage systems. Such an arrangement is described in U.S. Pat. No. 6,754,718, Jun. 22, 2004, Dobberpuhl, et al., entitled "Pushing Attribute information to Storage Devices for Network Topology Access", which is incorporated by reference herein. The foregoing issued patent also describes use of another management configuration command, an attach command, which is pushed to the data storage systems by the agent of a host in order to specify which LUNs are accessible or visible to particular hosts. It should be noted that the management requests may be the result of an operation performed on the management system 16. Similarly, commands may be used to retrieve information from data storage systems included in the SAN, for example, to display the topology of the SAN on the management system 16.

When each of the hosts 14a and 14b performs initialization processing, for example, prior to booting up, agent software, such as 124a and 124b, on each of the hosts may issue a push command to push each host's host identifier (host id) through one or more paths to the data storage system 102. On the data storage system, the management request is processed by the management software 130 which associates the particular path, over which the host id was received, with the host id. For example, the agent 124a of host 14a may push host 14a's host id, along with possibly other information, to the data storage system 102 over path 120c. Similarly, the agent 124b of host 14b may push host 14b's host id, along with possibly other information, to the data storage system 102 over paths 120a and 120b. In the embodiment described herein, the path may be identified using the WWN of the sending HBA and the WWN of the receiving port of the data storage system 102. It should be noted that the foregoing WWNs are part of the communications protocol used in connection with the embodiment described herein. In one embodiment, the information transmitted by the agent to the data storage system may also include the name and IP address of the host or server. In addition to pushing such information on boot up or other initialization processing, the agents on each host may also periodically issue a push command in order to keep the information on the data storage system up to date with any change in system topology including, for example, path changes, including path additions and deletions, with respect to a host. It should be noted that the host id and other information may be stored in an access control table. As will be described in more detail, portions of the information in the access control table may be used by one or both of the management software and access logic component.

The receiving data storage system may initially create a record in an access control table for each set of pushed information received via the push commands and the associated path of transmission. Once a host has sent or pushed such information, the receiving data storage system 102 may have multiple records of such data in the access control table to be consolidated due to the multiple paths from which a single host may communicate with the data storage system 102. Two paths from the same host id are assumed to be from the same host. Such an example are the two paths 120a and 120b from host 14b in which the same host id may be pushed on each of the different paths 120a and 120b. The management software 130 may perform such consolidation by associating all records having the same host id, though a different path, with the same host.

Management requests may also include commands to associate each host with a defined set of LUNs specifying to which LUNs a host may access. In this example, the particular sets of LUNs or storage groups (e.g., 104a and 104b) may then be associated with the one or more entries in the access control table corresponding to each host. The access logic 106 may then use the information in the access control table to determine whether to perform a data request based on the particular path information of a received request. The access logic 106 may determine which requests coming over certain paths are allowed specified access to LUNs as defined in the access control table.

In one embodiment, the host id may be comprised of two portions: a first portion which is a software generated portion, and a second portion which is based on a hardware property of the host or server. It should be noted that although particular instances of hardware properties and the software generated portion of the host id are described herein for purposes of illustration, an embodiment may use other instances than as described herein.

Figure 3:
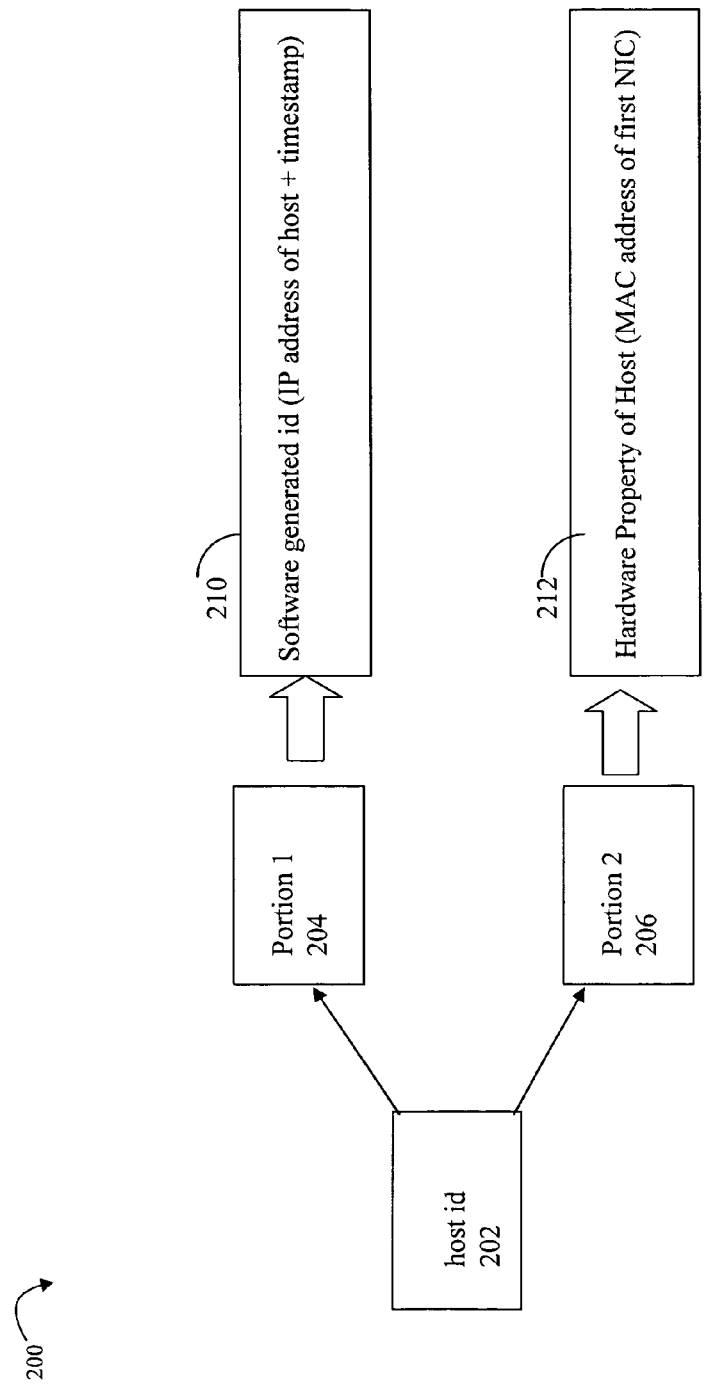
FIG. 3 is an example of an embodiment of a host id.

Referring now to FIG. 3, shown is an example 200 illustrating one particular instance of a host id 202. The first portion 204 may be a software generated identifier or id, such as generated using software residing on each host. The first portion 204 may be generated by the agent software, such as 124a and 124b, included on each host. The first portion 204 may be characterized as a generated key. One example of a software generated identifier used as the first portion 204 may be based on the IP address of the host and timestamp value, as illustrated in 210. In one embodiment, the first portion 204 may be a concatenation of the server's IP address with the a time stamp and/or date stamp (e.g., 10.14.12.43:8.4.2005). As will be appreciated by those skilled in the art, the foregoing is one designation of a first portion that may be made using the server's IP address and timestamp. The foregoing, or other information, may be used by the software agent residing on the host to generate a first portion 204. In one embodiment, the first portion 204 may be generated using a software algorithm. The first portion 204 may also be user-specified at the time a system image is generated for the host. Once generated, portion 1 of the host id may be persistently stored on the associated host. In the event that the system image from an associated host is cloned or replicated for use with another host or server, both the original host and the cloned or replicated host may have the same portion 1 of the host id. Thus, a second portion 206 may be used in conjunction with the first portion in order to uniquely associate a host id with each host in the SAN.

It should be noted that the first portion 204 may be characterized as an identifier determined at system generation time, for example, when creating the server or host image. Once created, this first portion may be stored persistently by the host. In one embodiment, the first portion 204 may stored in a file or other component on the host.

The second portion 206 may be based on a selected hardware property of the associated host. The hardware property selected for use in connection with 206 should be uniquely associated with a host as possible in order to be used in distinguishing one host or server from another. In one embodiment, the second portion 206 may be a MAC (media access control) address of the first NIC (network interface card) of the host or server. As known to those skilled in the art, a MAC address may be characterized as a unique code assigned to most forms of networking hardware. The address is permanently assigned to the hardware. The MAC address is a unique identifier specific to the network card inside the computer. MAC Addresses are of the form XX-XX-XX-XX-XX-XX, where the X's are either digits or letters from A-F. The MAC address is normally assigned to a device, such as a network interface card (NIC), when it is manufactured. It should be noted that a different hardware property may be used in connection with portion 2 of the host id. For example, a MAC address of a different NIC may be used. An embodiment may also use a serial number associated with a CPU. It should be noted that in connection with determining the hardware property from which the hardware id is determined, an embodiment may use any hardware component that has a programmatically retrievable unique identifier (e.g., can be determined or read by executing code) and has a high probability of not being removed from the host.

Figure 4:
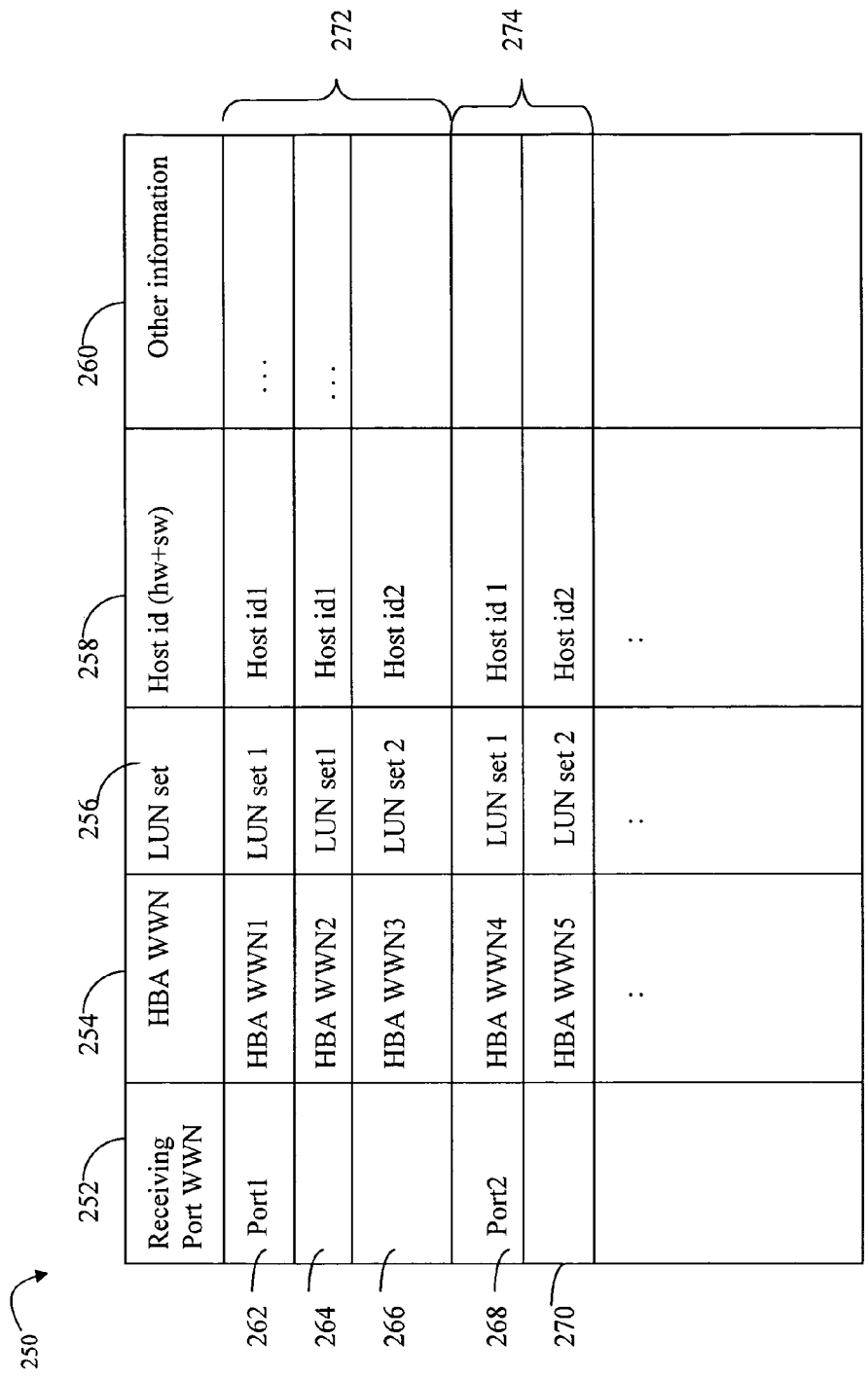
FIG. 4 is an example of an embodiment of information that may be included in an access control table.

Referring now to FIG. 4, shown is an example of an access control table 250 that may be used in connection with the techniques described herein. In one embodiment, the access control table 250 may be initially empty. The access control table 250 includes 5 columns of information—the WWN of the receiving port 252 of the data storage system, the HBA WWN 254 of a host, a LUN set or defined storage group of LUNs 256, a host id 258 and other information 260. An entry or row may be made in the table 250 by the management software 130 for each unique path upon which a management request has been received in which a host-id is pushed by the agent residing on the host, as described above. For example, the management software may create each of rows 262, 264, 266, 268, and 270 in response to different sets of information included in push commands received by the data storage system 102. The management software may populate fields 252, 254, 258 and 260 in accordance with the received management requests as pushed by agents from the hosts. Once received, the management software may also perform consolidation processing in which each entry or record having a common host id is deemed to belong to the same host. This is indicated by the entry in column 258, for example, in which records 262, 264, and 268 each have the same host id and are associated with a same host. Entries 266 and 270 have a same host id, "host id2", and are associated with the same host. Defined for one or more hosts may be a storage groups or set of LUNs designating which particular LUNs are visible or accessible to each of the one or more hosts. The table 250 may be further populated with the appropriate information in column 256 in accordance with the LUN sets or storage groups for each host's associated HBA. For example, assume host id1 is the host id for host 14a and host id2 is the host id for host 14b. If host 14a is allowed access to LUN set1, the management software may populate all appropriate entries for all HBAs of host 14a. Similarly, if host 14b is allowed access to LUN set 2, the management software may populate all appropriate entries for all HBAs of host 14b.

In this example, records in the access control table 250 are organized or grouped based on the receiving port WWN 252. A first portion 272 of records are associated with port1 of the data storage system. A second portion 274 of the records are associated with port2 of the data storage system. Other organizations and representation of the information in access control table 250 are possible. For example, an embodiment may include an arrangement in which there is a separate table of records for each receiving port WWN.

The information included in access control table 250 may be used in connection with subsequent operations performed by the access logic component 106, such as in determining whether a particular data request for data associated with a LUN is permitted. When a data request is received, the access logic component 106 may identify the appropriate entry in the access control table 250 in accordance with the path information (e.g., receiving port's WWN 252 and WWN of the HBA of host 254). Once the particular row has been identified, the information in field 256 of that row may be used in making a determination as to whether to allow the data request. In the event that the access logic component does not find a corresponding entry in the access control table 250, the data request may be denied.

It should be noted that processing may be performed by the management software in response to received management requests using the access control table. The management software may receive a management request pushed by an agent from a host to the data storage system 102 as described above. The management software may determine if there is an existing entry in the table including portions of the same information associated with the newly received management request. In one embodiment, the management software 130 may perform an action in accordance with a received host id and HBA WWN associated with a received management request and information currently included in the access control table 250. It should be noted that this determination may also be based on the receiving port WWN since this is also used in locating a matching entry in the access control table. Based on any detected differences between information of a received request and information included in the access control table, the management software may take an appropriate action. The particular differences, analysis, and responsive actions that may be taken are described in more detail in following paragraphs. The responsive actions for one or more detected differences may be in accordance with a defined policy. This is also described in more detail in following paragraphs.

Referring now to FIG. 5, shown is an example of a case table 300 of various cases and associated inferences as may be encountered by the management software when processing push commands received at a data storage system. The management software may receive a management request for a push command on a path and the request may contain a particular host id. The management software may perform processing to determine whether the host id and associated HBA WWN and the WWN of the data storage system port of the requested path matches existing information included in an entry of the access control table 250. The case table 300 summarizes the different cases or possibilities that may be encountered when processing the received push command request although other types of management requests may be used in an embodiment. Based on the particular case diagnosed by the management software, the management software may draw an inference or conclusion and take an appropriate action depending on the degree of difference/similarity between an existing entry and the received request's information. Table 300 includes three columns—302, 304 and 306—each identifying the different possible combinations for the host id portions (e.g., software generated portion 1 and hardware property portion 2) and the WWN of the HBA associated with the received request. Note that each case is associated with a row of the case table 400. Each case may be represented using a triple indicating which portions of information associated with a received management request match particular portions of information associated with an entry of the access control table 250. For example, row 334 of case table 300 may be represented by triple (difference, difference, difference) corresponding to the case in which no existing entry in the table matches any portion of a received management request indicating that the received management request is for a new host. The management software may perform a defined action in accordance with detecting this particular case. The particular action may be determined in accordance with the case as well as any defined policy. The management software may determine that a new entry may be created in the access control table for the new host. A policy may be defined in which all new entries added to the access control table for a new host require user interaction and approval prior to updating the access control table. Other embodiments may define other actions and associated policies.

Following is a detailed description of the inferences and possible actions for the various cases of detected differences illustrated in table 300. If there is a difference with respect to any one or more of the three components (e.g., software generated id, HBA WWN, and hardware id) associated with a received push command request and existing entries in the access control table, the management software may take appropriate action. In response to receiving a management request push command, the management software may perform processing to determine which one of the cases in the table 300 of FIG. 5 is relevant. The management software may further take responsive actions in accordance with the detected case and any defined policy.

It should be noted that a policy may be defined indicating what actions are to be taken for specific cases enumerated in FIG. 5. The policy may be configurable using one or more parameters. The policy may indicate which particular cases require user interaction before taking any further action. The policy may also identify particular cases for which the management software may perform automated processing such as, for example, to update the access control table in accordance with the detected condition without user interaction and/or approval. The policy may also indicate that when the access control table is updated, a message may be output in a log or at a management console. In connection with cases where a new host is detected, a user may be prompted to define the allowable access for the new host. In one embodiment, as many cases as possible may be automated in accordance with an acceptable degree of certainty or confidence that a change does not indicate a new server or host. For remaining cases which are not automated, an embodiment may alert the user that user action is needed, and prompt the user for any additional information. An embodiment may also log any changes, both automated and via user interaction, made to the table. Such logged information may be used in connection with the auditing of a system. An embodiment may include the policy handler as part of the management software 130 of the data storage system.

Row 320 corresponds to the case in which both portions of the host id as well as the HBA WWN of a received management request match an existing entry in the access control table 450. In this instance, no differences are detected with respect to any entry and no action is taken with respect to the access control table 450. Row 320 corresponds to the case in which the received management request has been received from an existing host from an associate and known HBA.

Row 322 corresponds to the case in which the software generated id (e.g., first portion of the host id) and the HBA WWN of a received request matches an existing entry but the hardware id (e.g., second portion of the host id) does not match the same entry. Since the software generated id and the HBA WWN match an existing entry, this means that cloning a system image cannot be the cause for this, even though the MAC address is different. The management software may conclude that a previously existing NIC in the host has been replaced with a different NIC. In this case, the entries in the access control table belonging to the host (e.g., all entries having the same first portion of the host id) may be updated to reflect the new MAC address of the new NIC. The management software may perform this action automatically without further user interaction. A policy may be defined which may allow such automatic updates to the access control table in response to detecting this case as well as other cases indicated in case table 300. Alternatively, a policy may be defined in which user interaction and/or approval is required prior to updating the access control table associated with this and/or other cases indicated in case table 300.

Row 324 corresponds to the case in which both portions of the host id of a received request match those of an existing entry in the access control table but the HBA WWN does not. In this instance, it may be concluded that a new HBA has been installed on an existing known host. The new HBA may be added, for example, to replace a previously installed HBA, or may be added as a new additional HBA. The management software may update the access control table to reflect this by adding a new entry in the table or updating the existing entry. The new entry may include information in column 304 for the new HBA, information from columns 302 and 306 of the existing entry, and also access information (e.g., what LUNs are visible or accessible) from the existing entry. As described above, whether the management software performs any updates to the access control table automatically without further user interaction may be in accordance with a defined policy.

Row 326 corresponds to the case in which the software id portion of the host id of a received request match an existing entry in the access control table but the hardware id portion of the host id and the HBA WWN of the received request does not match the existing entry. In this instance, an HBA and NIC of an existing server may be installed in a new server having the software id as included in the received request. This case may also occur if the software generated id of an existing server has been modified. When the case indicated by row 326 is detected, the management software may treat the host making the received request like a new server and require user interaction and/or approval for the new host to obtain connectivity to the data storage system. Prior to creating a new entry in the access control table corresponding to the received request, a policy may be defined requiring user interaction to obtain acknowledgement/and or approval along with the particular access provisions for the new host.

Row 328 corresponds to the case in which the HBA WWN and hardware id portion of a received request match an existing entry in the access control table, but the software generated id portion does not match the existing entry. In this case, a determination may be made that the original server was completely uninstalled and reinstalled, or that the HBA and NIC have been moved to a different server. In connection with detecting the case corresponding to row 328, user interaction may be required since this case, although unlikely, may indicate that a new server has sent the received request. Processing may be performed as defined in accordance with an existing policy. In one embodiment, a user may be prompted with the detected condition and may enter a response indicating either reinstallation of an existing server, or the existence of a new server. In the event that an existing server has been reinstalled, the management software may then update entries of the access control table associated with the existing server to reflect the new software generated id. In the event that a new server has been added, the management software may then receive a response via user interaction as to whether a new entry should be created in the access control table for the received request. If an entry is created, the particular storage access for the new host may also be obtained via user input.

Row 330 corresponds to the case in which the HBA WWN of a received request matches an existing entry in the access control table but both portions of the host id do not match those of the existing entry. In connection with the instant case, it may be determined that an HBA has been moved to a different host. The management software may perform processing to update the access control table. For example, processing may be performed for adding a new host as identified in the received request. This may include user interaction and obtaining approval to add an entry to the access control table providing access to the newly detected host. Additionally, based on user input, processing may be performed to update the existing entry in the access control table which includes the matching HBA WWN. With respect to the existing entry, such actions may include removing the entry as well as updating the HBA WWN portion in accordance with user input.

Row 332 corresponds to the case in which the hardware id of a received request matches that of an existing entry in the access control table but the software generated id and HBA WWN of the received request do not match those of the existing entry. The management software may determine that the NIC hardware has been moved to a different host. This case may be treated as a new server. The management software may update the access control table to reflect this case. Such updates may include adding a new entry to the access control table for the new host. The access control table update may occur after user interaction and/or approval in accordance with a defined policy.

Row 334 corresponds to the case in which no portion of the host id or HBA WWN of a received request match any existing entry in the access control table 250. In this instance, it may be determined that a new host has sent the received request. Processing may be performed in accordance with adding a new host. This may include adding a new entry to the access control table. The access control table update may occur after user interaction and/or approval in accordance with a defined policy.

An embodiment may define a policy in which the management software on the data storage system may transparently take an action in response to determining one or more cases. In one embodiment, policy parameters may be specified so that the management software performs an analysis to determine which of the cases illustrated in FIG. 5 is present. In the event that the current information for a received request corresponds to either of the cases represented by rows 322 and 324, the access control table may be updated without an user interaction. In accordance with a defined policy in one embodiment, for example, when cases 324 and 330 are detected, the software may automatically or transparently update the access control table.

It should be noted that in instances where new entries are added, the new entries may inherit the access (e.g., what LUNs are accessible) as defined in other existing entries associated with the same host.

Figure 6:
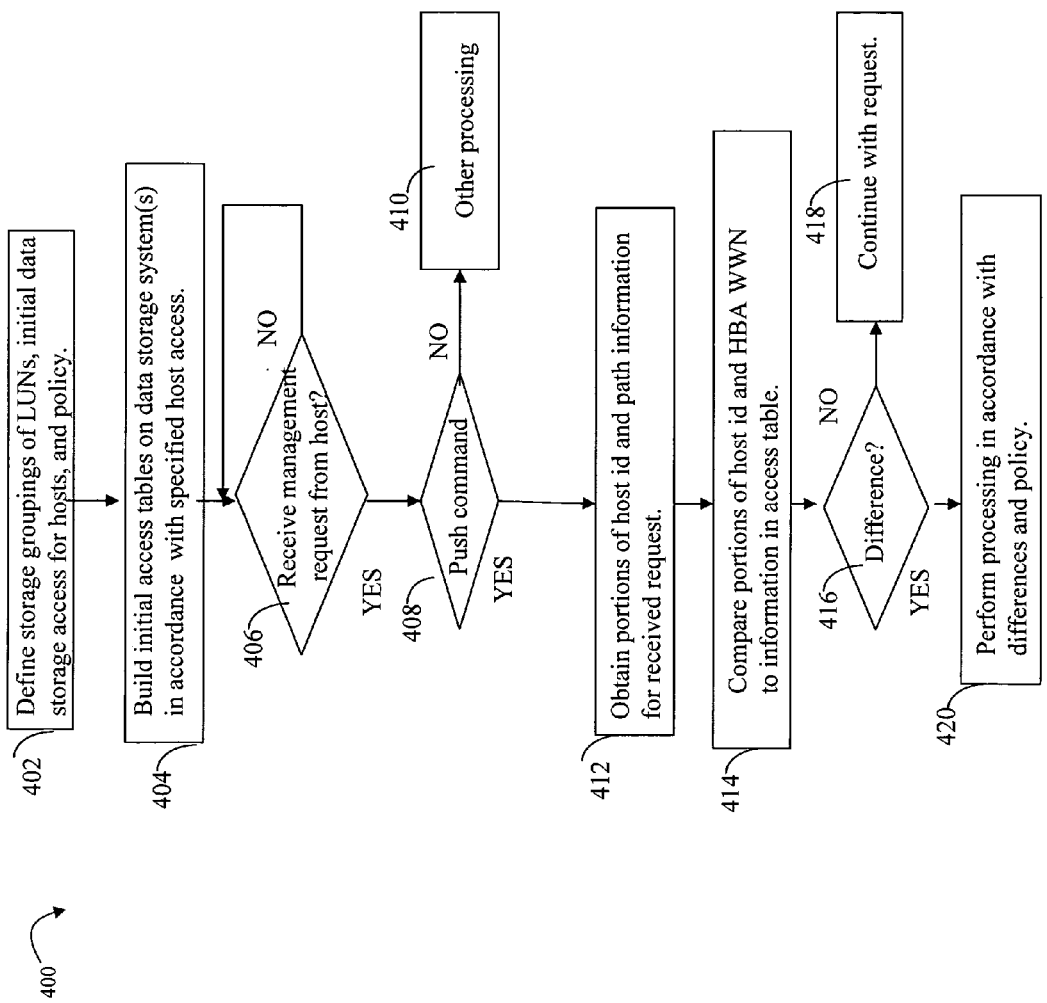
FIG. 6 is a flowchart of processing steps that may be performed in an embodiment in connection with the techniques described herein.

Referring now to FIG. 6, shown is a flowchart 400 of processing steps as may be performed in an embodiment in connection with the techniques described herein. The steps of flowchart 400 summarize processing described elsewhere herein. At step 402, one or more initialization steps may be performed. Step 402 may include defining LUN sets or storage groups of LUNs (e.g., such as 104a and 104b of FIG. 2), defining data storage access for the hosts (e.g., what LUNs may be accessed by which hosts), and specifying a policy, if any, to be used in connection with actions to be performed in accordance with the cases of case table 300. At step 404, the access control table may be initially populated in accordance with the specified host accesses. Step 404 may include, for example, receiving management requests (e.g., push commands) pushed from agents on one or more hosts. As described herein, the management requests may push the host-id of each host along one or more paths from each host. Using this information associated with these management requests and the defined host data storage access, the access control table may be initialized. It should be noted that steps 402 and 404 may be performed at any time prior to performing the remainder of flowchart 400. At step 406, a determination is made as to whether a management request has been received from a host. Processing continues to wait at step 406 until a management request is received at the data storage system. When a management request is received, control proceeds to step 408 where a determination is made as to whether the request is a push command. The management request received may be for performing a variety of different management commands or operations as may be included in an embodiment. In one embodiment described herein, a push command may be used in connection with updating the access control table. The push command is described elsewhere herein from an agent on a host pushing the host id and other host attributes to the data storage system. As described herein, a push command may be sent from one or more hosts at various times. A push command may be sent when a host boots up, at periodic time intervals to update the information stored on the data storage systems, and the like. If step 408 determines that the command is not a push command, control proceeds to step 410 to perform other processing. If step 408 determines that management request is a push command, control proceeds to step 412 where portions of the host id (e.g., software generated id and hardware id) and path information (e.g., HBA WWN and WWN of receiving data storage system port) are obtained. Using the information from step 412, comparisons are made to entries in the access control table to determine any partially or completely matching entries. As illustrated in connection with FIG. 5, three components of information are compared and an existing entry may match any one, two or all three components. At step 416, a determination is made as to whether there are any matching entries having no difference with respect to the received request. If so, control proceeds to step 418 to continue processing with the received request. Step 418 may be performed if the management software determines the case corresponding to row 320 of case table 300. Otherwise, if there is some degree of difference with respect to the information associated with the received request and an existing entry, control proceeds to step 420 to perform processing in accordance with the detected differences and any defined policy. The processing at step 420 may include the management software taking a responsive action in accordance with the determined case (e.g., as included in case table 300) and any defined policy.

In connection with some embodiments, the particular policy defined affecting automated updated of the access control table may vary with a variety of different factors. For example, in one embodiment, it may be common practice to add HBAs to existing data storage systems. In such instances, it may be advantageous to define policy in which the access control table is automatically updated by the management software when the management software detects this case. The policy may further specify what is inherited from existing entries for the newly created entry. In one embodiment, the newly created entry may inherit the access information from existing entries for the same host (e.g., the same host being determined in this case with those access control table entries having the same first and second portions of the host id as those of the received push command).

Another factor that may affect the particular policy is the type of data stored on one or more of the data storage systems. A policy may be defined so that automatic updates to the access control table are not performed when the automatic updates would make available particular data storage systems and/or devices containing highly confidential, sensitive or critical data.

When selecting a policy, the size of the network as well as the degree of connectivity provided to the data storage systems may be considered. In the event that a system is compromised, the amount and type of information available to the attacker may be a factor in whether there is automated updating of the access control table.

As will be appreciated by those skilled in the art, the automated updating of the access control table in accordance with a case analysis (e.g., FIG. 5) and policy may also be used in connection with different versions of the host identifier than as illustrated in FIG. 3. An embodiment may use a different, less secure, version of a host identifier alone or in combination with the host identifier as illustrated in FIG. 3. In other words, an embodiment may include one or more hosts that use a different version of a host identifier which increases the security vulnerabilities when compared to those vulnerabilities associated with the host identifier of FIG. 3. For example, an embodiment may include multiple hosts in which a first partition of the hosts uses a form of the host identifier as in FIG. 3 and a second partition of the hosts uses a different, less secure, form of host identifier. The different form of host identifier may be, for example, a host identifier which is only one of the first or second portions as illustrated in FIG. 3. In the event that an embodiment includes one or more hosts with host identifiers which are based on only one of the foregoing host identifier portions rather than the combination of FIG. 3, there may be increased security issues if there is also automated updating of the access control table. In such instances in which a less secure version of a host identifier may be in use, a policy may be defined to inform the user of an identified case and to obtain user input rather than perform automated updates of the access control table. For example, an embodiment may include one or more hosts each having a host identifier which is only the first portion illustrated in FIG. 3. This embodiment may also provide for automated updating when the management software identifies a known host (e.g., same host id) with a new HBA WWN. There are increased security risks with the foregoing since the first portion of the host id may be associated with two hosts, such as when the system image of a first host is copied for use with a second different host. If a policy is defined for automated updating of the access control table in this case, the second host may be inadvertently provided with access to all LUNs accessible to the first host. Rather than have a policy for automated updating of the access control table, a policy may be alternatively defined in which the user is prompted with the analyzed case information. Prior to updating the access control table, the user approval, acknowledgement, or other inputs may be required in accordance with the policy. The particular policy selected may vary in accordance with the vulnerabilities associated with the particular host identifiers.

An embodiment may also use a version of a host identifier which includes a non-deterministic component. The non-deterministic component may be characterized as a value which is not readily reproducible. The use of a non-deterministic component in a host identifier makes it more difficult to generate and determine a host identifier. A non-deterministic component may be added as a component for use in connection with any existing host identifier.

What will now be described are various embodiments of a host identifier that may include a non-deterministic component in combination with other information although it will be appreciated by those skilled in the art that other variations than as described herein may also be used. In one embodiment, the non-deterministic component may be a randomly generated number as may be produced, for example, using a random number generation function. In one embodiment the random number may be generated using a time-based seed in accordance with the current time at which random number generation is performed.

Figure 7:
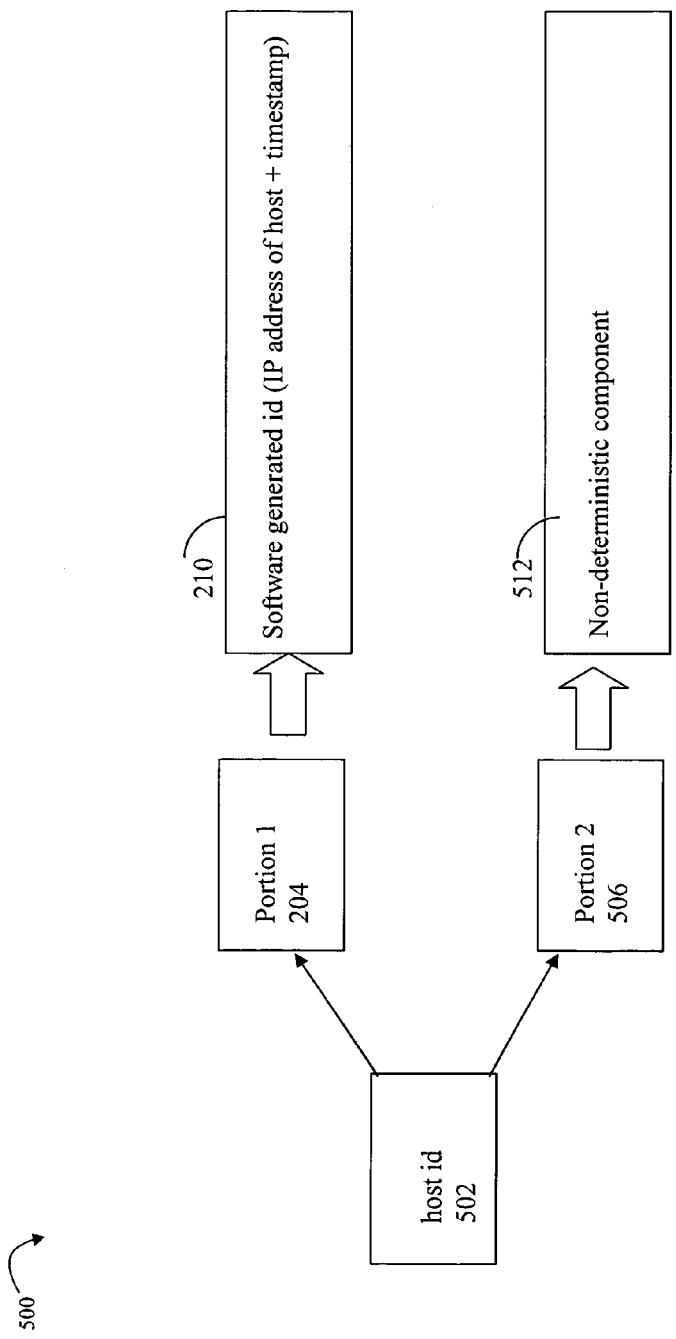
FIGS. 7-9 include examples of host identifiers that may be used in an embodiment in connection with techniques herein.

Referring now to FIG. 7, shown is a first example of a host identifier including a non-deterministic component. The host id 502 in this example includes two portions. The first portion 204 may be the software generated id 210 as described previously in connection with other figures. The host id 502 may also include a second portion 506 which is the non-deterministic component 512. As in connection with other host ids, the first and second portions may be concatenated, in any order, or used as basis for generating a further variation.

Figure 8:
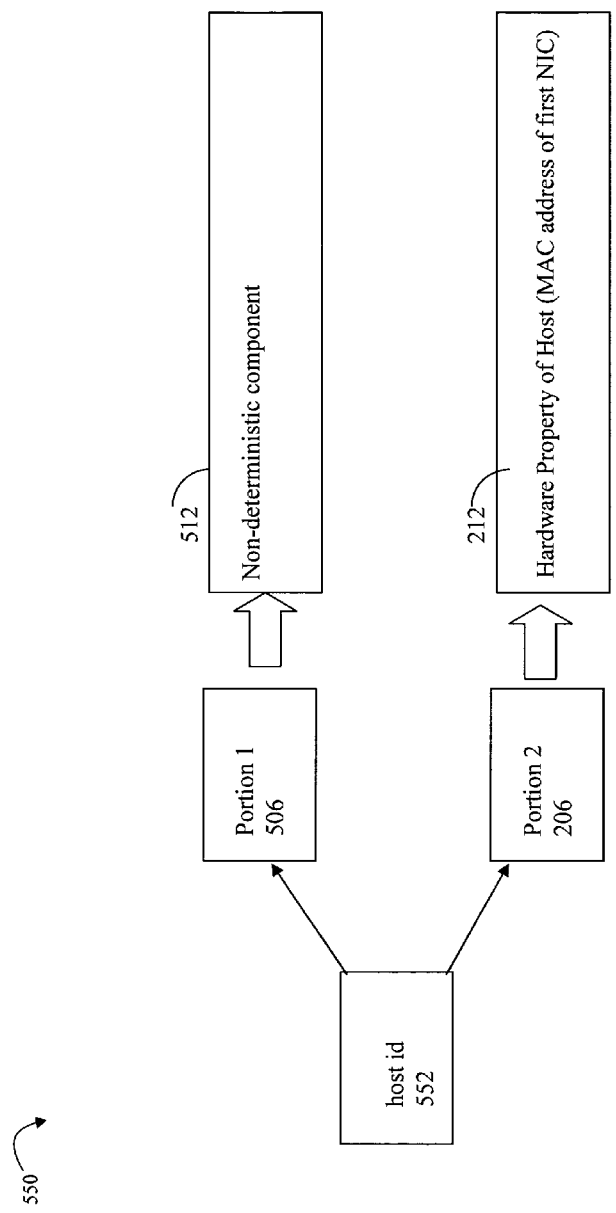

Referring now to FIG. 8, shown is a second example of a host identifier including a non-deterministic component. The host id 552 includes two portions. The first portion 506 is the non-deterministic component 512. The second portion 206 may be the hardware property 212 as described previously in connection with other figures. As in connection with other host ids, the first and second portions may be concatenated, in any order, or used as a basis for generating a further variation.

Figure 9:
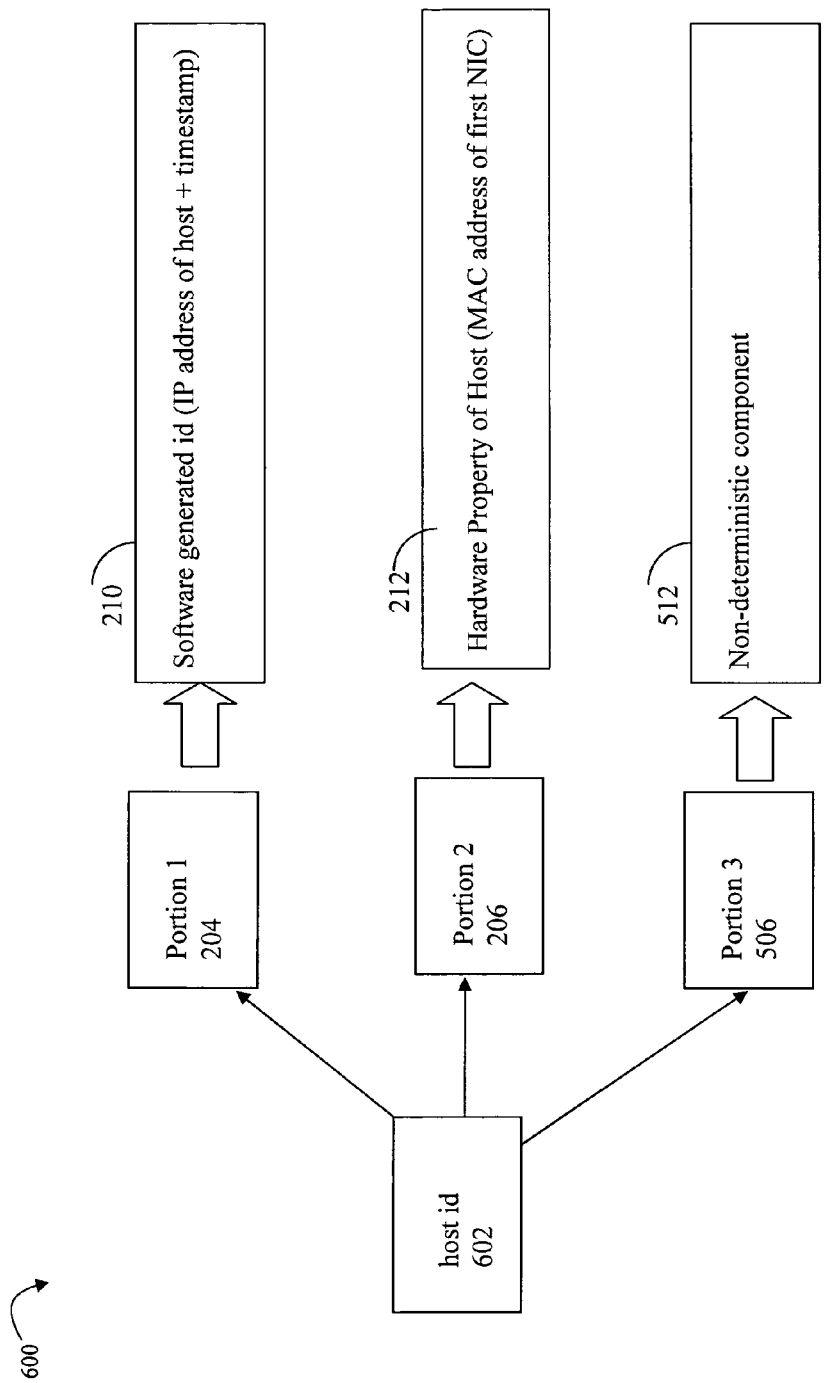

Referring now to FIG. 9, shown is a third example of a host identifier including a non-deterministic component. The host id 602 includes three portions. The first portion 204 and second portion 206 is as described in connection with FIG. 3. Additionally, the host id 602 include a third portion 506 which is the non-deterministic component 512. As in connection with other host ids, the portions may be concatenated, in any order, or used as basis for generating a further variation.

Once a host identifier is produced in connection with any one of the embodiments described herein, the host identifier may be stored persistently on a host with restricted access. For example, on a host system running a version of the Windows operating system, the host identifier may be stored as value in the system registry with restricted or limited access. Such access may be specified using, for example, an access control list (ACL), or restricting access to system or other selected privileged accounts. The host identifier may also be stored in a file with similar restricted access provisions in accordance with an embodiment. When changes are made affecting the host id, such as a new hardware component is installed, the persistently stored host identifier may be accordingly updated. Another embodiment may choose not to persistently store all portions of the host identifier. For example, in one embodiment, the software generated portion may be persistently stored and the hardware portion may be determined when needed by executing code to retrieve the information from the particular hardware component or other location including the information about the hardware component currently residing on the host. In this instance, when there is a change regarding a hardware component used in generating the host identifier, the new host identifier may be determined and pushed to the data storage system, but the hardware portion of the host identifier may not be persistently stored along with the software generated portion. It should also be noted that the software and hardware portions may be stored separately.

In connection with modifications to the access control table, an embodiment may keep an audit trail of any changes to the access control table (e.g., new entries indicating a configuration change). The audit trail may be maintained for those changes which are performed in an automated fashion as well as with user input indicating approval or acknowledgement. For a given configuration change made by the management component, the audit trail may include tracking the information in the access control table that has been modified and may identify the particular host identifier associated with the modification.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for providing a host identifier for a host comprising:
    sending, from the host to a data storage system, a plurality of management requests defining what storage of the data storage system is accessible to the host over which one or more paths, wherein said plurality of management requests are used in connection with defining a topology of a storage area network including connectivity between the host and the data storage system, said sending including sending a management request of said plurality of management requests that includes the host identifier over a first path to the data storage system, said host identifier being formed using a first portion and a second portion, said host identifier being used to uniquely identify said host in the storage area network, said first portion including a first identifier associated with a system image for the host, said second portion including a second identifier generated in accordance with a hardware property of said host, wherein sending said management request over a particular path to the data storage system defines said particular path as an allowable path in the topology over which the host can access storage of the data storage system;
    receiving, by the data storage system, said management request over said first path from the host;
    performing, by the data storage system in response to receiving said management request over the first path identified by a first sending port identifier of a first sending port of the host from which the management request is sent and a first receiving port identifier of a first receiving port of the data storage system at which the management request is received, processing to define said first path as an allowable path in the topology over which a host having the host identifier can access a portion of storage of the data storage system by issuing subsequent data requests over the first path, said processing including storing information about said host in an access control table used in determining whether to allow a data request received by the data storage system, said information including said host identifier, said first sending port identifier and said first receiving port identifier for the first path, and identifying the portion of storage;
    receiving, at a second receiving port of the data storage system, a second management request from a second host having a second host identifier, said second management request being sent over a second path defined by a second sending port identifier of a second sending port of the second host and a second receiving port identifier of the second receiving port; and
    determining a degree of difference between corresponding portions of second information and first information, wherein said second information includes the second host identifier, said second sending port identifier, and said second receiving port identifier and wherein said first information includes said host identifier, said first sending port identifier and said first receiving port identifier, wherein said determining a degree of difference includes determining whether the second information is associated with the host or a different host, and determining whether a host bus adapter which is included in the host and includes said first sending port has been replaced in said host with a new host bus adapter.

2. The method of claim 1, wherein said first identifier is produced using software executed on said host.

3. The method of claim 1, wherein said first identifier is user specified.

4. The method of claim 1, wherein said first identifier is generated using a network address of said host and at least a portion of a timestamp.

5. The method of claim 1, wherein said hardware property is an address associated with a hardware component of said host, and wherein said hardware component is a network interface card and said address is a unique address assigned to said hardware component when manufactured.

6. The method of claim 1, wherein a third of said plurality of management requests received over a third path at said data storage system defines said third path as another allowable path in addition to said first path over which a host having the host identifier can access the portion of storage by issuing a subsequent data request over the third path, and wherein a fourth of said plurality of management requests received on a fourth path at said data storage system defines a path deletion and causes the data storage system to update the access request table by deleting said fourth path as an allowable path to access storage of the data storage system for a host having the host identifier.

7. A method for processing a management request comprising:
receiving, at a data storage system from a host, a plurality of management requests defining what storage of the data storage system is accessible to the host over which one or more paths, wherein said plurality of management requests are used in connection with defining a topology of a storage area network including connectivity between the host and the data storage system, said plurality of management requests including a management request received at a second connectivity point of the data storage system from a first connectivity point of the host, said management request including an associated host identifier identifying said host and being associated with a second identifier identifying said first connectivity point and a third identifier identifying said second connectivity point, said management request being sent by said host over a path defined by said first connectivity point and said second connectivity point and defining said path as an allowable path in the topology over which the host can access storage of the data storage system, said host identifier including a first portion that varies with software installed on the host and a second portion that varies with a hardware property of the host; and
performing, by the data storage system in response to receiving the management request over the path, processing to define the path as an allowable path in the topology over which a host having the host identifier can access a portion of storage of the data storage system by issuing subsequent data requests over the path, said processing including storing in an access control table said host identifier, said path and identifying, a portion of storage, said processing including determining, by said data storage system in accordance with data including said host identifier, said third identifier and said second identifier associated with the management request, if there is an existing entry in the access control table corresponding to first information including the portions of the host identifier, said second identifier and said third identifier, said determining including:
identifying one of a plurality of cases indicating a degree of correspondence between an existing entry in said access control table and the first information, wherein said access control table associates a portion of storage and one or more paths with each host identifier stored therein, at least a first of said one or more paths for said each host identifier being a path over which a management request has been received by said data storage system from a host having said each host identifier, said access control table indicating that a subsequent data request to access a storage device in said portion is allowed when the subsequent data request is received by the data storage system over any of said one or more paths from a host having said each host identifier; and
determining an inference based on said degree of correspondence between the existing entry and the first information, said determining an inference including determining whether the degree of correspondence indicates that a host bus adapter which is included in the host and includes said first connectivity point has been moved to another host, and determining whether the degree of correspondence indicates that a host bus adapter which is included in the host and includes said first connectivity point has been replaced in said host with a new host bus adapter.

8. The method of claim 7, wherein said first portion of the host identifier is generated in accordance with an identifier associated with a system image of the host.

9. The method of claim 8, further comprising:
determining differences between entries in said access control table and said host identifier; and
performing an action based on any determined differences.

10. The method of claim 9, further comprising:
determining that said host is a new host if an entry in said access control table does not include information corresponding to said second identifier and said second portion of said host identifier.

11. The method of claim 9, further comprising:
determining that a hardware component of said host having said hardware property has been replaced if an entry in said access control table includes information corresponding to said second identifier and said first portion of said host identifier, and does not include information corresponding to said second portion of said host identifier, and updating entries in said access control table for said host to include said second portion.

12. The method of claim 9, further comprising:
determining that a new host bus adapter has been installed at said host if an entry in said access control table includes information corresponding to said first and second portions of said host identifier, and does not include information corresponding to said second identifier associated with said first connectivity point, and accordingly updating entries in said access control table.

13. The method of claim 9, further comprising:
determining that a host bus adapter associated with said first connectivity point of said host has been included for use with another host if there is an entry in said access control table including information corresponding to said second identifier, and the entry does not include information corresponding to said first and second, portions of said host identifier.

14. The method of claim 9, further comprising:
determining that a hardware component of said host having said hardware property has been included for use with another host if an existing entry in said access control table includes information corresponding to said second portion of said host identifier and said entry does not include information corresponding to said first portion of said host identifier and said second identifier.

15. The method of claim 9, further comprising:
determining that said host has been reinstalled, or that a hardware component of said host having said hardware property and another hardware component associated with said first connectivity point have been moved to another host from said host if an existing entry in said access control table includes information corresponding to said second portion of said host identifier and said second identifier and the entry does not include information corresponding to said first portion of said host identifier.

16. The method of claim 7, further comprising:
performing an action in accordance with a policy and in accordance with said one of the plurality of cases selected by said determining, said policy indicating whether said action is to be performed without further user interaction.

17. A computer program product including a non-transitory computer readable medium comprising code stored thereon for providing a host identifier for a host, the non-transitory computer readable medium comprising code that:
sends, from the host to a data storage system, a plurality of management requests defining what storage of the data storage system is accessible to the host over which one or more paths, wherein said plurality of management requests are used in connection with defining a topology of a storage area network including connectivity between the host and the data storage system, said sending including sending a management request of said plurality of management requests that includes the host identifier over a first path to the data storage system, said host identifier being formed using a first portion and a second portion, said host identifier being used to uniquely identify said host in the storage area network, said first portion including a first identifier associated with a system image for the host, said second portion including a second identifier generated in accordance with a hardware property of said host, wherein sending said management request over a particular path to the data storage system defines said particular path as an allowable path in the topology over which the host can access storage of the data storage system;
receives, at the data storage system, said management request over said first path from the host;
performs, by the data storage system in response to receiving said management request over the first path identified by a first sending port identifier of a first sending port of the host from which the management request is sent and a first receiving port identifier of a first receiving port of the data storage system at which the management request is received, processing to define said first path as an allowable path in the topology over which a host having the host identifier can access a portion of storage of the data storage system by issuing subsequent data requests over the first path, said processing including storing information about said host in an excess control table used in determining whether to allow a data request received by the data storage system, said information including said host identifier, said first sending port identifier and said first receiving port identifier for the first path, and identifying the portion of storage;
receives, at a second receiving port of the data storage system, a second management request from a second host having a second host identifier, said second management request being sent over a second path defined by a second sending port identifier of a second sending port of the second host and a second receiving port identifier of the second receiving port; and
determines a degree of difference between corresponding portions of second information and first information, wherein said second information includes the second host identifier, said second sending port identifier, and said second receiving port identifier and wherein said first information includes said host identifier, said first sending port identifier and said first receiving port identifier, wherein determining a degree of difference between the first information and the second information includes determining whether the second information is associated with the host or a different host, and determining whether a host bus adapter which is included in the host and includes said first sending port has been replaced in said host with a new host bus adapter.

18. The computer program product including the non-transitory computer readable medium of claim 17, wherein said first identifier is produced using software executed on said host.

19. The computer program product including the non-transitory computer readable medium of claim 17, wherein said first identifier is generated using a network address of said host and at least a portion of a timestamp.

20. The computer program product including the non-transitory computer readable medium of claim 17, wherein said hardware property is an address associated with a hardware component of said host.

* * * * *